United States Patent [19]

Lipkins

[11] 3,977,765
[45] Aug. 31, 1976

[54] HOLLOW RETROREFLECTOR MOUNT

[76] Inventor: Morton S. Lipkins, 3 Nemeth St., Malverne, N.Y. 11565

[22] Filed: May 17, 1974

[21] Appl. No.: 470,991

[52] U.S. Cl. ............................... 350/102; 350/107
[51] Int. Cl.² ........................................ G02B 5/122
[58] Field of Search ............ 350/102, 97, 100, 103, 350/107

[56] References Cited
UNITED STATES PATENTS
3,663,084  5/1972  Lipkins .............................. 350/102

OTHER PUBLICATIONS
Harrison, "Mounting For Corner Cube Prisms", IBM Technical Disclosure Bulletin, vol. 16, No. 7, Dec. 1973, p. 2370.

Primary Examiner—John K. Corbin

[57] ABSTRACT

Known hollow retroreflectors comprise three plates united along joints where the plates abut one another and have reflecting faces oriented to define a hollow reflecting right-angled corner. Yieldable support means for the hollow retroreflector extends from the joints to a supporting structure, and ideally the engagement of the yieldable support means with the hollow retroreflector is confined to said joints.

8 Claims, 2 Drawing Figures

U.S. Patent   Aug. 31, 1976   3,977,765

HOLLOW RETROREFLECTOR MOUNT

This invention relates to hollow retroreflectors.

BACKGROUND

In U.S. Pat. No. 3,663,084 issued May 16, 1972, there is disclosed a hollow retroreflector consisting of three plates joined together so as to form a hollow corner where three optically flat reflecting faces meet. In an example, a cluster of retroreflectors left on the moon is used to intercept light such as a laser beam from the earth and reflect the beam to earth. Retroreflectors have the distinctive property of reflecting the incoming beam back to its source without requiring any special or critical orientation of the retroreflector in relation to the beam. The efficiency or resolution of such a reflector depends importantly on the precision of the right-angled relationships of the reflecting faces and on their flatness.

SUMMARY OF THE INVENTION

Hollow retroreflectors have joints where the reflecting plates are united, and their manufactured accuracy is preserved against distorting effects imposed on them while in use by confining the points of attachment to the joints. Resilient supports are ideal for this purpose. The supports can only transmit modest forces from the supporting structure, and the location of the supports only at the joints limits the application of external forces essentially to the planes of the flat reflecting plates. This configuration of supports is uniquely effective in resisting applied forces that might otherwise distort the reflecting plates and harm the resolution.

ILLUSTRATIVE EMBODIMENT

Figure 1:
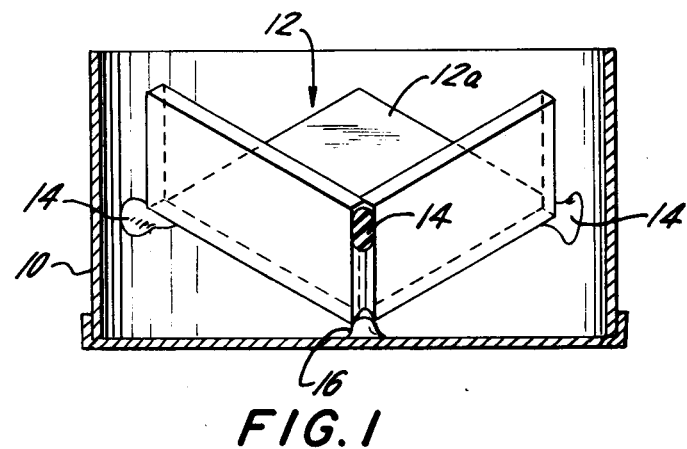
Figure 2:
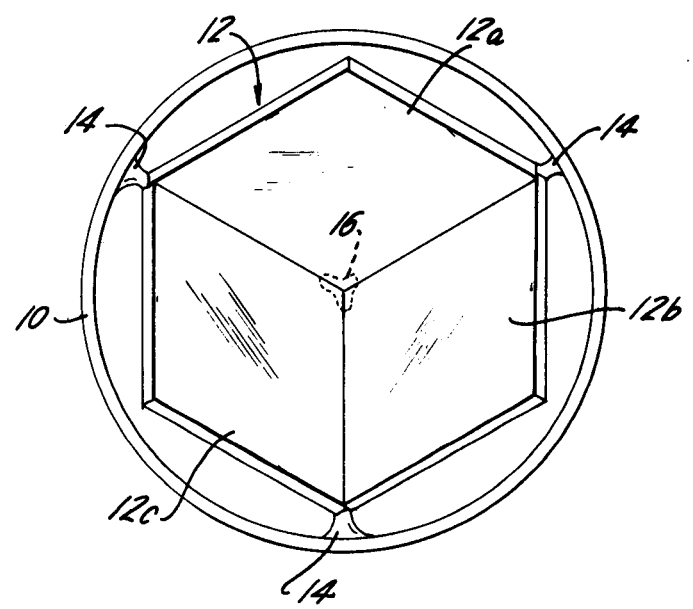

A presently preferred embodiment of the invention in its various aspects is shown in the accompanying drawing, wherein:

FIG. 1 is a lateral view, partly in crosssection, of a retroreflector embodying features of the invention; and FIG. 2 is a top plan view of the embodiment of FIG. 1.

Referring now to the drawings, the illustrated container 10 has a flat bottom and a cylindrical side wall. Container 10 acts as a support structure for hollow retroreflector 12 consisting of three glass plates 12a, 12b and 12c. The support structure need not be the housing itself, but instead a separate frame or set of brackets can be used as the support structure. These plates have optically flat reflecting faces disposed at right angles to each other. These surfaces meet at a hollow corner to constitute the hollow retroreflector, sometimes referred to as a "hollow corner-cube reflector". The plates are assembled and united with careful attention to establishing and preserving the desired accurate right-angled relationship. Here (as in the patent mentioned above), one edge of plate 12a abuts a marginal face portion of plate 12b, and cement unites these plates, forming joints where they are in abutment. Similarly, an edge of plate 12b abuts a marginal face portion of plate 12c, and these plates are united at a second joint where they are in abutment. Finally, an edge of plate 12c abuts a marginal face portion of plate 12a, and the abuting portions of these plates are united by cement to form a third joint.

Three rubbery masses 14 are secured between housing 10 and the retroreflector 12. Engagement of masses 14 with retroreflector 12 is confined to the three joints uniting the plates. The rubbery masses 14 can only impose forces on plates 12a, 12b and 12c that are directed along the plates, only in tension or in compression, so that bending or warping stresses are avoided. The reflecting plates are inherently very effective in resisting any such stresses. Consequently, stresses that might be impressed by the supporting housing 10 on retroreflector 12 have little if any tendency to warp the reflecting faces.

In usual applications, the performance of the retroreflector does not depend on maintaining a fixed relationship between the reflector orientation and the incident beam. Consequently, slight vibration of the retroreflector carried by its resilient supports 14 is inconsequential.

For better security of the supporting means for retroreflector 12, a fourth resilient support 16 may be applied to the junction of all three plates which form an external apex of the retroreflector. This support is disposed at the joints of the plates and, like the other resilient supports, support 16 can only apply forces along the reflector plates and transverse warping forces are avoided.

Supports 14 and 16 may be in the form of prepared rubber plugs, adhered to the joints of the retroreflector and bonded to the housing, through use of a suitable adhesive. The plates are well suited to resist stresses of compression and of tension that may be applied at their edges, that is, at the joints of the illustrated hollow retroreflector.

Another method of creating the illustrated resilient supports is to mold uncured silicone rubber in place, and effect curing. Still other procedures and other support configurations will be apparent to those skilled in the art. Consequently, the invention should be construed broadly in accordance with its full spirit and scope.

What is claimed is:

1. A hollow retroreflector assembly including a retroreflector formed of three plates having flat reflecting faces meeting each other at right angles and each of said plates meeting the other two of said plates at respective junctions thereby constituting three junctions extending at right angles to each other, a support structure for supporting said retroreflector, and means for supporting said retroreflector on said support structure, said supporting means being confined to the proximity of said junctions, for limiting the retroreflector-supporting forces essentially to the planes of the three plates.

2. A hollow retroreflector assembly in accordance with claim 1, wherein said junctions extend along lines meeting at an apex and wherein said supporting means includes resilient elements disposed at protions of said junctions spaced from said apex.

3. A hollow retroreflector assembly in accordance with claim 1, wherein said supporting means consists of localized masses of resilient material.

4. A hollow retroreflector assembly in accordance with claim 1, wherein said junctions meet at an apex and wherein said supporting means includes three resilient elements disposed at portions of said junctions spaced from said apex, and a resilient element between said support structure and said apex.

5. A hollow retroreflector assembly in accordance with claim 1, wherein said supporting means includes resilient material interposed between said support structure and said retroreflector wherever said retroreflector is supported.

6. A hollow retroreflector assembly in accordance with claim 5, wherein said resilient material comprises localized resilient masses at said junctions.

7. A hollow retroreflector assembly in accordance with claim 5, wherein said junctions extend along lines meeting at an apex and wherein said resilient material includes three localized resilient masses disposed at portions of said junctions spaced from said apex.

8. A hollow retroreflector assembly in accordance with claim 5, wherein said junctions meet at an apex and wherein said resilient material includes three localized resilient masses disposed at portions of said junctions spaced from said apex and a localized resilient mass between said support structure and said apex.

* * * * *